United States Patent [19]
Yang

[11] Patent Number: 5,839,471
[45] Date of Patent: Nov. 24, 1998

[54] SEALING MEMBER FOR A VALVE

[76] Inventor: Tsai Chen Yang, No. 15-11, Tou Ren Lane, Tou Ren Li, Lu Gang Town, Chang Hua, Hsien, Taiwan

[21] Appl. No.: 938,763

[22] Filed: Sep. 26, 1997

[51] Int. Cl.⁶ .................................................. F16K 11/07
[52] U.S. Cl. ............................... 137/625.18; 137/625.48; 251/367
[58] Field of Search ............................... 157/597, 625.18, 157/625.48, 625.5; 251/367

[56] References Cited

U.S. PATENT DOCUMENTS 806,271  12/1905  Manning et al. ............... 137/625.18 X
3,487,435  12/1969  Sheardown ......................... 137/625.18
4,258,786  3/1981  Lochte et al. .................. 137/625.18 X

*Primary Examiner*—John Fox

[57] ABSTRACT

A valve includes a base having a chamber and two inlets communicating with the chamber, and a cover engaged on the base. The base includes a peripheral groove formed around the chamber for engaging with a sealing member and includes six notches communicating the peripheral groove with the chamber. A valve seat is secured in the chamber and a valve member is slidably engaged in the valve seat. Three sealing rings are engaged between the valve seat and the housing and engaged with the notches of the sealing member for making a water tight seal for the valve.

3 Claims, 3 Drawing Sheets

5,839,471

SEALING MEMBER FOR A VALVE

BACKGROUND OF THE INVENTION

1. Field of the Invention

The present invention relates to a sealing member, and more particularly to a sealing member for a valve.

2. Description of the Prior Art

Typical valves, particularly the valves for controlling hot water and cold water, comprise a number of sealing rings for spacing a number of chambers and for forming water tight seal. However, the sealing rings may not be suitably provided for forming excellent water tight seal for the valves.

The present invention has arisen to mitigate and/or obviate the afore-described disadvantages of the conventional sealing members for valves.

SUMMARY OF THE INVENTION

The primary objective of the present invention is to provide a sealing member for forming excellent water tight seal for the valve.

In accordance with one aspect of the invention, there is provided a valve comprising a housing including a chamber, and including a base having two inlets communicating with the chamber, and including a cover engaged on the base and having two outlets, the base including an upper portion having a peripheral groove formed around the chamber, a sealing member engaged in the peripheral groove of the base, a valve seat secured in the chamber of the housing and including two openings for communicating with the inlets of the base and including two end portions and a middle portion, three sealing rings engaged on the end portions and the middle portion of the valve seat and engaged between the valve seat and the housing, a first of the sealing rings being provided between a first of the outlets and a first of the inlets for making a water tight seal between the first outlet and the first inlet, a second of the sealing rings being engaged on the middle portion of the valve seat and being provided between the inlets for making a water tight seal between the inlets, and a third of the sealing rings being provided between a second of the outlets and a second of the inlets and for making a water tight seal between the second outlet and the second inlet, and a valve member slidably engaged in the valve seat and including two ports for communicating with the openings and the inlets respectively.

The upper portion of the base includes six notches communicating the peripheral groove with the chamber, the sealing member includes six protrusions engaged in the notches and engaged with the sealing rings. The second sealing ring is secured between two protrusions.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
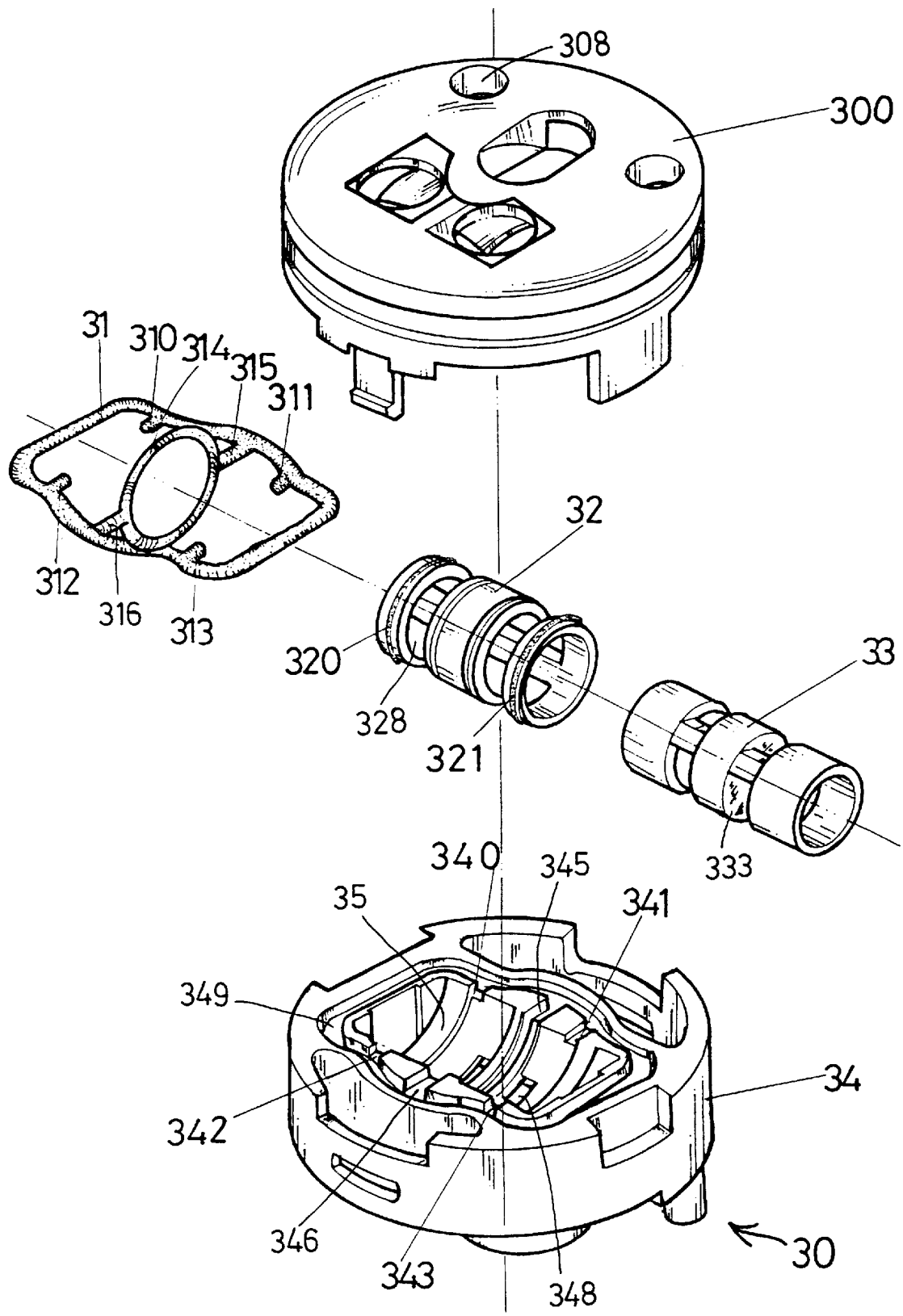
FIG. 1 is an exploded view of a valve.
Figure 2:
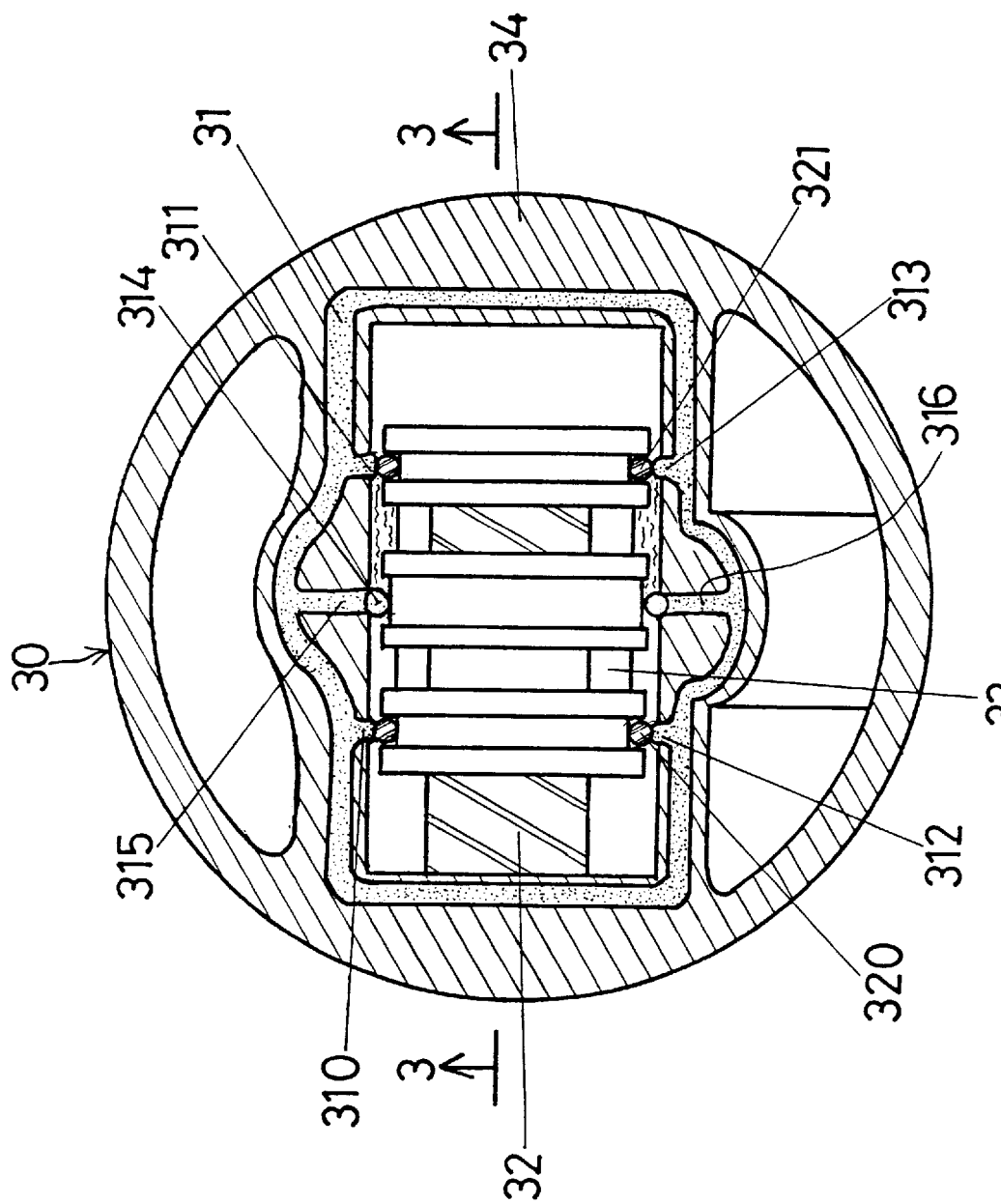
FIG. 2 is a cross sectional view taken along lines 2—2 of FIG. 3.
Figure 3:
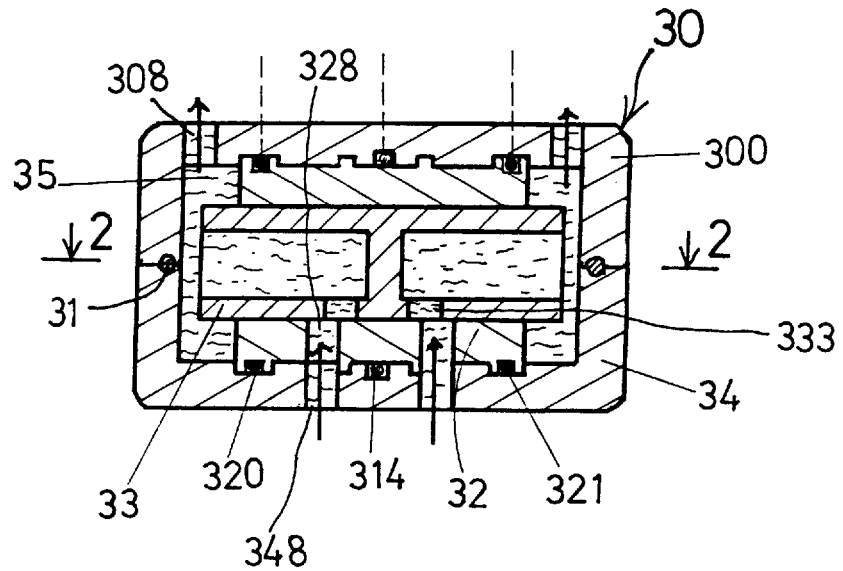
FIG. 3 is a cross sectional view taken along lines 3—3 of FIG. 2.
Figure 4:
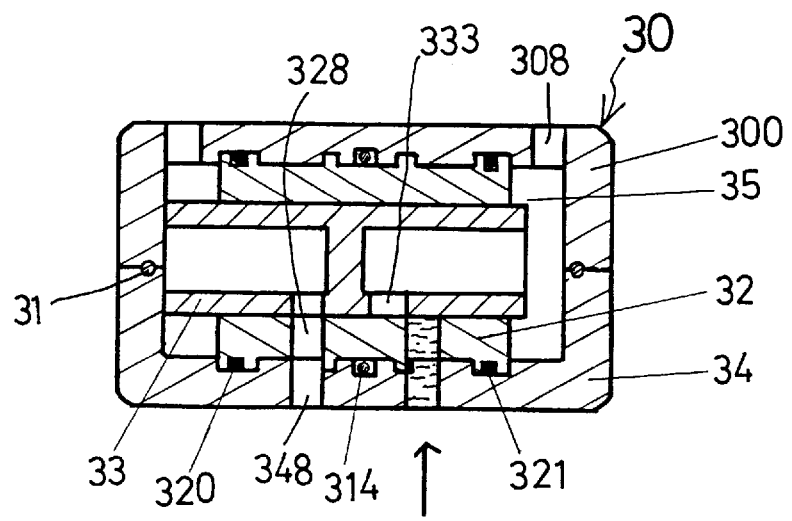
FIG. 4 is a cross sectional view similar to FIG. 3, illustrating the operation of the valve.

Referring to the drawings, and initially to FIGS. 1–3, a valve in accordance with the present invention comprises a housing 30 including a base 34 and a cover 300 secured on top of the base 34. The base 34 of the housing 30 includes two inlets 348 communicating with the hot water and cold water reservoirs respectively and includes a chamber 35 for receiving a valve seat 32 and includes a peripheral groove 349 formed in the upper surface and formed around the chamber 35 and includes six notches 340, 341, 342, 343, 345, 346 communicating the peripheral groove 349 with the chamber 35. A sealing member 31 is engaged in the peripheral groove 349 of the base 34 and engaged between the base 34 and the cover 300 for making a water tight seal between the base 34 and the cover 300 (FIGS. 3, 4). The sealing member 31 includes six protrusions 310, 311, 312, 313, 315, 316 engaged in the notches 340–346 and includes a sealing ring 314 secured between the protrusions 315, 316 which are arranged between the protrusions 310, 311; and 312, 313 respectively. The cover 300 includes two outlets 308.

The valve seat 32 includes two openings 328 communicating with the inlets 348 of the base 34 (FIGS. 3, 4) and includes two sealing rings 320, 321 engaged on the end portions and engaged between the valve seat 32 and the housing 30. The sealing ring 314 of the sealing member 31 is engaged on the middle portion of the valve seat 32. The protrusions 310, 312 are engaged with the sealing ring 320 and the protrusions 311, 313 are engaged with the sealing ring 321. The sealing rings 320, 321 and 314 may be provided for separating the chamber 35 of the housing 30 into four separating spaces. The engagement of the protrusions 310, 312, 311, 313 with the sealing rings 320, 321 and the provision of the sealing ring 314 may make an excellent water tight seal for the valve (FIGS. 2–4). A valve member 33 is slidably engaged in the valve seat 32 and includes two ports 333 for communicating with the openings 328 of the valve seat 32 and the inlets 348 of the base 34 (FIGS. 3, 4).

In operation, as shown in FIG. 4, when the valve member 33 is moved to one end of the chamber 35 for disengaging one of the ports 333 from the opening 328 and for engaging one end of the valve member 33 with the housing 30, the water from the inlets 348 may not flow into the valve. However, as shown in FIG. 3, when the valve member 33 is moved toward the middle portion of the chamber 35 for communicating the ports 333 with the openings 328, the water from the inlets 348 may flow into the valve member 33 via the openings 328 and the ports 333 and may flow out of the valve via the outlets 308 of the cover 300. The sealing ring 320 may prevent the cold water, for example, from flowing backward into the opening 328. The sealing ring 321 may also prevent the hot water, for example, from flowing backward into the opening 328. The sealing rings 320, 321 may thus form an excellent water tight seal between the inlets 348 and the outlets 308 respectively. The sealing ring 314 makes an excellent water tight seal between the inlets 348 and between the openings 328.

Accordingly, the valve in accordance with the present invention includes a sealing member for forming excellent water tight seal for the valve.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:

a housing including a chamber, and including a base having two inlets communicating with said chamber, and including a cover engaged on said base and having two outlets, said base including an upper portion having a peripheral groove formed around said chamber, a sealing member engaged in said peripheral groove of said base, a valve seat secured in said chamber of said housing and including two openings for communicating with said inlets of said base and including two end portions and a middle portion, three sealing rings engaged on said end portions and said middle portion of said valve seat and engaged between said valve seat and said housing, a first of said sealing rings being provided between a first of said outlets and a first of said inlets for making a water tight seal between said first outlet and said first inlet, a second of said sealing rings being engaged on said middle portion of said valve seat and being provided between said inlets for making a water tight seal between said inlets, and a third of said sealing rings being provided between a second of said outlets and a second of said inlets and for making a water tight seal between said second outlet and said second inlet, and a valve member slidably engaged in said valve seat and including two ports for communicating with said openings of said valve seat and said inlets of said base respectively.

2. The valve according to claim 1, wherein said upper portion of said base includes six notches communicating said peripheral groove with said chamber, said sealing member includes six protrusions engaged in said notches of said base and engaged with said sealing rings.

3. The valve according to claim 2, wherein said second sealing ring is secured to and secured between two of said protrusions and engaged on said middle portion of said valve seat.

* * * * *